(12) United States Patent
Lee (10) Patent No.: US 9,462,405 B2
(45) Date of Patent: Oct. 4, 2016

(54) APPARATUS AND METHOD FOR GENERATING PANORAMIC SOUND

(71) Applicant: Samsung Electronics Co., Ltd., Suwon-si (KR)

(72) Inventor: Kang Eun Lee, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 604 days.

(21) Appl. No.: 13/731,567

(22) Filed: Dec. 31, 2012

(65) Prior Publication Data

US 2013/0170649 A1 Jul. 4, 2013

(30) Foreign Application Priority Data

Jan. 2, 2012 (KR) .................. 10-2012-0000070

(51) Int. Cl.
| | |
|---|---|
| H04R 5/00 | (2006.01) |
| H04S 5/00 | (2006.01) |
| G01S 3/80 | (2006.01) |
| H04S 3/00 | (2006.01) |
| H04S 7/00 | (2006.01) |

(52) U.S. Cl.
CPC ............... H04S 5/005 (2013.01); H04S 3/00 (2013.01); *G01S 3/8006* (2013.01); *H04S 3/008* (2013.01); *H04S 7/30* (2013.01); *H04S 2420/01* (2013.01)

(58) Field of Classification Search
CPC ............ H04S 5/005; H04S 3/00; H04S 5/00; H04S 7/00; H04S 2420/01; H04S 7/30; H04S 3/02; H04S 3/008; H04S 2400/00; H04S 2400/05; H04S 2400/11; H04S 5/02; H04S 3/002; H04R 2430/03; H04R 5/00; G06F 17/00; G10L 19/008; G10L 19/173; G10L 19/167; G10L 19/018; H04H 20/89; G10S 3/8006

USPC ......... 381/1, 18, 17, 20, 61, 27, 97, 119, 63, 381/99, 10, 19, 310, 23, 73.1, 123; 700/94; 704/205, E19.001, 500
See application file for complete search history.

(56) References Cited

U.S. PATENT DOCUMENTS

| | | | |
|---|---|---|---|
| 7,760,886 B2 * | 7/2010 | Hellmuth et al. ............. 381/27 |
| 7,970,144 B1 * | 6/2011 | Avendano ............... H04S 7/30 | 381/1 |
| 2009/0055196 A1 * | 2/2009 | Oh ....................... G10L 19/008 | 704/500 |
| 2011/0081024 A1 * | 4/2011 | Soulodre .............. G01S 3/8006 | 381/17 |
| 2011/0116638 A1 * | 5/2011 | Son ......................... H04S 3/008 | 381/1 |

(Continued)

FOREIGN PATENT DOCUMENTS

| | | |
|---|---|---|
| JP | 2010-252220 | 11/2010 |
| KR | 10-2005-0019001 | 2/2005 |

(Continued)

*Primary Examiner* — Vivian Chin
*Assistant Examiner* — Ubachukwu Odunukwe
(74) *Attorney, Agent, or Firm* — Staas & Halsey LLP (57) ABSTRACT

An apparatus and method for generating a panoramic sound are provided. The panoramic sound generation apparatus may include a panning coefficient calculation unit to calculate a panning coefficient that represents directivity of a sound source using an input signal, a masker determination unit to determine a direction masker that extracts a sound source of a desired direction based on the panning coefficient, and a channel separation unit to separate to be used as an output signal, output to a sound output device, using the direction masker.

16 Claims, 9 Drawing Sheets

(56) References Cited

U.S. PATENT DOCUMENTS

| | | |
|---|---|---|
| 2011/0137662 A1 | 6/2011 | McGrath et al. |
| 2011/0238425 A1* | 9/2011 | Neuendorf ............ G10L 19/008 704/500 |
| 2012/0155653 A1* | 6/2012 | Jax et al. ........................ 381/22 |
| 2012/0163608 A1* | 6/2012 | Kishi et al. .................... 381/23 |
| 2013/0054253 A1* | 2/2013 | Shirakawa et al. ........... 704/500 |
| 2014/0072124 A1* | 3/2014 | Stoecklmeier et al. ........ 381/27 |

FOREIGN PATENT DOCUMENTS

| | | |
|---|---|---|
| KR | 10-2008-0009007 | 1/2008 |
| KR | 10-2009-0117897 | 11/2009 |
| KR | 10-2009-0131237 | 12/2009 |
| KR | 10-2010-0081999 | 7/2010 |
| KR | 10-2010-0084332 | 7/2010 |
| KR | 10-2011-0049863 | 5/2011 |
| KR | 10-2011-0053600 | 5/2011 |
| WO | 2010/019750 A1 | 2/2010 |

\* cited by examiner

APPARATUS AND METHOD FOR GENERATING PANORAMIC SOUND

CROSS-REFERENCE TO RELATED APPLICATIONS

This application claims the priority benefit of Korean Patent Application No. 10-2012-0000070, filed on Jan. 2, 2012, in the Korean Intellectual Property Office, the disclosure of which is incorporated herein by reference.

BACKGROUND

1. Field

Embodiments of the following description relate to an apparatus and method for generating a panoramic sound and, more particularly, to an apparatus and method for generating a more realistic panoramic sound by applying signal processing to a 2-channel stereo input so that a sound surrounds a listener.

2. Description of the Related Art

Conventionally, audio contents are provided to a listener in a 2-channel stereo format. As a multichannel system is recently becoming widespread, a demand from users for multichannel signal reproduction or a multichannel signal effect is increasing rapidly.

Reproduction of a multichannel signal may be performed by converting an original 2-channel signal to a multichannel signal and reproducing the multichannel signal via a multichannel speaker. Here, a technology for expanding an input 2-channel to a multichannel is called up-mixing. However, when a real speaker is adapted for only a 2-channel signal, post-processing of an output signal is necessary to provide a panoramic sound effect to a listener even with the 2-channel speaker.

According to a conventional method for generating a panoramic sound, signal processing is applied to a general 2-channel stereo input signal so that a sound surrounds a listener and a more vibrant sound is provided to the listener. However, the conventional method has the following problems.

Since the conventional method generates a virtual speaker without separation of a sound source, interference between sound sources hinders generation of the virtual speaker.

In addition, a sound may be reproduced in a direction unintended by a sound source manufacturer and one sound source may be reproduced through both a real speaker and a virtual speaker, thereby causing a ghost sound image.

Furthermore, in an environment for reproducing an extracted multichannel signal, a location of a speaker may differ according to users. Thus, since there is a change in a location of the speaker, from an original intention, a sound image may be lost.

In conclusion, the conventional method of generating a panoramic sound has the following problems of (i) generation of a ghost sound source caused by overlapping of sound sources, (ii) hindrance in generation of a virtual speaker due to interference by the overlapping of sound sources, and (iii) damage to a sound image caused when structures are different between a speaker used by a user and a speaker intended by a channel separation technology. Accordingly, there is a need for solving the aforementioned limitations.

SUMMARY

According to an aspect of one or more embodiments, there is provided a panoramic sound generation apparatus including a panning coefficient calculation unit to calculate a panning coefficient that represents directivity of a sound source using an input signal, a masker determination unit to determine a direction masker that extracts a sound source of a desired direction based on the panning coefficient, and a channel separation unit to separate the input signal to be used as an output signal, and to output the output signal to a sound output device, using the direction masker.

The panoramic sound generation apparatus may further include a virtual localization unit to generate a virtual signal from the output signal according to a type of the sound output device.

According to an aspect of one or more embodiments, there is provided a panoramic sound generation method including calculating a panning coefficient that represents directivity of a sound source using an input signal; determining a direction masker that extracts a sound source of a desired direction based on the panning coefficient; and separating the input signal to be used as an output signal, and outputting the output signal to a sound output device, using the direction masker.

The panoramic sound generation method may further include generating a virtual signal from the output signal according to a type of the sound output device.

According to an aspect of one or more embodiments, there is provided a panoramic sound generation apparatus including a masker determiner to determine a direction masker that extracts a sound source of a desired direction based on a panning coefficient which represents directivity of a sound source based on an input signal; and a channel separator to separate the input signal to be used as an output signal, and to output the output signal to a sound output device, using the direction masker.

According to an aspect of one or more embodiments, there is provided a panoramic sound generation method including determining a direction masker that extracts a sound source of a desired direction based on the panning coefficient which represents directivity of a sound source based on an input signal; and separating the input signal to be used as an output signal using at least one processor, and outputting the output signal to a sound output device, using the direction masker.

According to another aspect of one or more embodiments, there is provided at least one non-transitory computer readable medium storing computer readable instructions to implement methods of one or more embodiments.

A panoramic sound generation apparatus according to embodiments may provide a realistic sound effect to a user.

A panoramic sound generation apparatus may extract panning information of a sound source based on a 2-channel input signal, and may separately supply the sound source according to a location of a speaker being used by the user based on the panning information. Therefore, a ghost sound source caused by overlapping of sound sources may be removed.

Since panoramic sound generation apparatus may apply a sound source separation technology, overlapping of sound sources at one speaker is prevented. Accordingly, interference by overlapping of sound sources between speakers may be prevented.

A sound output device receives configuration information of a speaker from a user and extracts a sound source corresponding to a direction of a speaker currently being used. Therefore, damage of a stereo image caused by inconsistency in directivity between a real speaker and a separated sound source may be prevented.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
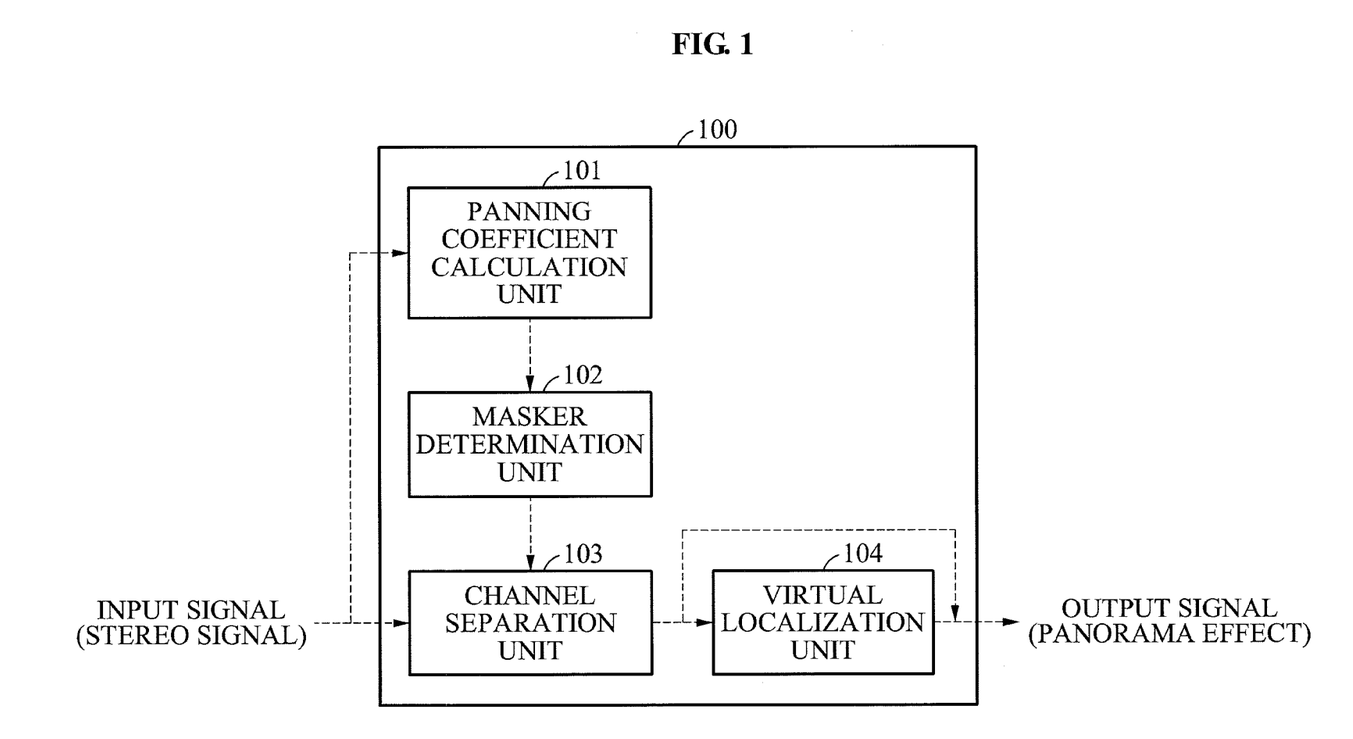
FIG. 1 illustrates a panoramic sound generation apparatus according to embodiments.

FIG. 1 illustrates a panoramic sound generation apparatus 100 according to embodiments.

Referring to FIG. 1, the panoramic sound generation apparatus 100 may include a panning coefficient calculation unit (panning coefficient calculator) 101, a masker determination unit (masker determiner) 102, and a channel separation unit (channel separator) 103. The panoramic sound generation apparatus 100 may further include a virtual localization unit (virtual localizer) 104.

The panning coefficient calculation unit 101 may calculate a panning coefficient representing directivity of a sound source using an input signal. For example, the panning coefficient calculation unit 101 may calculate the panning coefficient using a frequency component based on the input signal.

The masker determination unit 102 may determine a direction masker for extracting a sound source of a desired direction based on the panning coefficient. Here, the masker determination unit 102 may determine the direction masker for masking a sound source having a panning coefficient corresponding to a direction of a sound output device that corresponds to a target location.

For example, the masker determination unit 102 may include a control coefficient determiner and a window processor.

The control coefficient determiner 102 may determine a control coefficient for windowing a panning coefficient using configuration information of the sound output device. For example, the control coefficient determiner may determine the control coefficient using a first angle based on a first sound output device corresponding to a left boundary and a second sound output device corresponding to a right boundary, a second angle based on a third sound output device corresponding to a target location, a third angle based on a fourth sound output device adjoining a left side of the target location, and a fourth angle based on a fifth sound output device adjoining a right side of the target location.

The window processor may process a panning coefficient window based on the sound output device, using the control coefficient. The window processor may process a window of which a value is maximized in a direction corresponding to the sound output device and decreased in a direction toward an adjacent sound output device.

The channel separation unit 103 may separate the input signal to be used as an output signal, output to a sound output device, using the direction masker. For example, the channel separation unit 103 may apply the direction masker to the input signal based on an angle of a sound output device corresponding to the target location.

The virtual localization unit 104 may generate a virtual signal from the output signal according to a type of the sound output device. For example, the virtual localization unit 104 may generate the virtual signal by applying a head related transfer function (HRTF) when the sound output device is a pair of headphones. When the sound output device is a stereo speaker, the virtual localization unit 104 may generate the virtual signal by applying the HRTF and a crosstalk canceller.

The respective elements illustrated in FIG. 1 will be described in further detail with reference to FIGS. 2 to 9.

Figure 2:
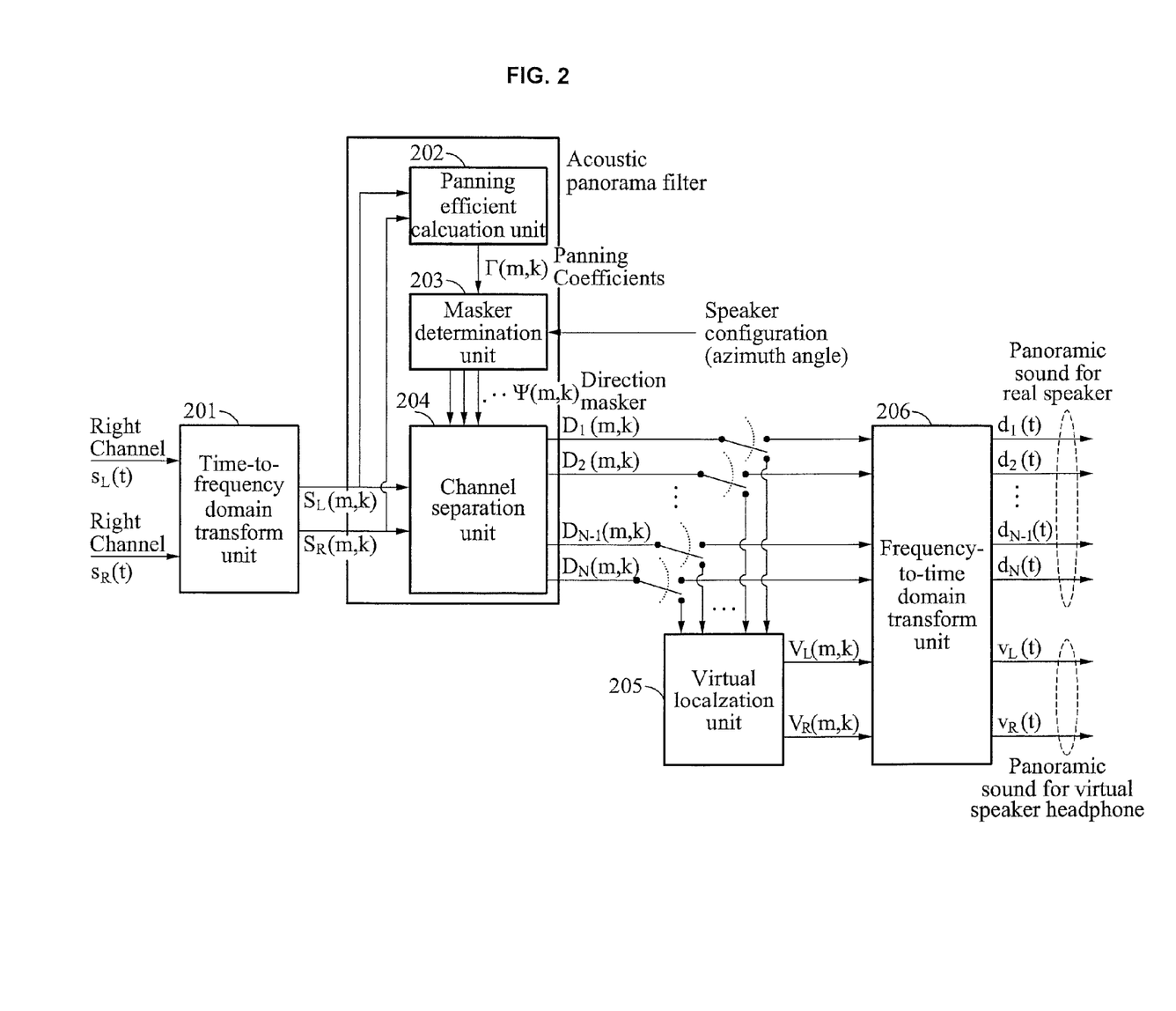
FIG. 2 illustrates a process of deriving an output signal to which a panoramic sound effect is applied according to embodiments.

FIG. 2 illustrates a process of deriving an output signal to which a panoramic sound effect is applied according to embodiments.

Referring to FIG. 2, an input signal may be transformed from a time domain signal to a frequency domain signal through a time-to-frequency (T-F) domain transform unit 201. Here, presuming that the input signal includes a left channel signal $S_L(t)$ and a right channel signal $S_R(t)$, the left channel signal $S_L(t)$ and the right channel signal $S_R(t)$ may be transformed to $S_L(m, k)$ and $S_R(m, k)$, respectively, through the T-F domain transform unit 201. Here, m denotes a frame index and k denotes a frequency index.

According to FIG. 2, a panning coefficient calculation unit 202, a masker determination unit 203, and a channel separation unit 204 constitute an acoustic panorama filter.

The transformed left channel signal $S_L(m, k)$ and the transformed right channel signal $S_R(m, k)$ may be input to the panning coefficient calculation unit 202. The panning coefficient calculation unit 202 may calculate a panning coefficient $\Gamma(m,k)$ using the transformed channel signals $S_L(m, k)$ and $S_R(m, k)$. The panning coefficient $\Gamma(m,k)$ may be input to the masker determination unit 203. The masker determination unit 203 may determine a direction masker $\psi(m, k)$ for separating sound sources corresponding to respective sound output devices using the panning coefficient and configuration information of the sound output device, the configuration information input by a user.

When the sound output device to which a final output signal is to be output is not a multichannel speaker or is a headphone, the configuration information of the sound output device may include configuration information related to a standard 5.1-channel speaker.

The direction masker ψ(m, k) derived by the masker determination unit 203 may be input to the channel separation unit 204. The channel separation unit 204 may separate, from the transformed input signals $S_L(m, k)$ and $S_R(m, k)$, multichannel output signals $D_1(m,k), \ldots, D_N(m,k)$ to be output from speakers which are the sound output devices designated by the user, using the direction masker ψ(m, k).

When the sound reproduction device is the multichannel speaker having more than 2 channels, the separated multichannel output signal may be transformed to an output signal of a time domain through a frequency-to-time (F-T) domain transform unit 206. The output signal separated through the channel separation unit 204 may be output through a corresponding speaker of the multichannel speaker.

When the power reproduction device is a 2-channel speaker or a headphone, the separated multichannel output signal may be input to the virtual localization unit 205. The virtual localization unit 205 may output a virtual signal $V_L(m,k)$ corresponding to a left channel and a virtual signal $V_R(m,k)$ corresponding to a right channel so that a sound of the multichannel output signal is audible to the user in a virtual multichannel direction. The virtual signals $V_L(m,k)$ and $V_R(m,k)$ may be transformed to signals $v_L(t)$ and $v_R(t)$ corresponding to the time domain through the F-T domain transform unit 206, and output through the stereo speaker or a pair of headphones.

The panoramic sound generation apparatus according to embodiments may provide a realistic sound effect to a user.

First, the panoramic sound generation apparatus extracts panning information of a sound source based on a 2-channel input signal, and separately supplies the sound source according to a location of a speaker being used by the user based on the panning information. Therefore, a ghost sound source caused by overlapping of sound sources may be removed.

Second, since the panoramic sound generation apparatus applies a sound source separation technology, overlapping of sound sources of different sound sources at one speaker may be prevented. Accordingly, interference caused by overlapping of sound sources between speakers may be prevented.

Third, the sound output device receives configuration information of a speaker from a user and extracts a sound source corresponding to a direction of a speaker being currently used. Therefore, damage of a stereo image caused by inconsistency of direction between a real speaker and a separated sound source may be prevented.

Figure 3:
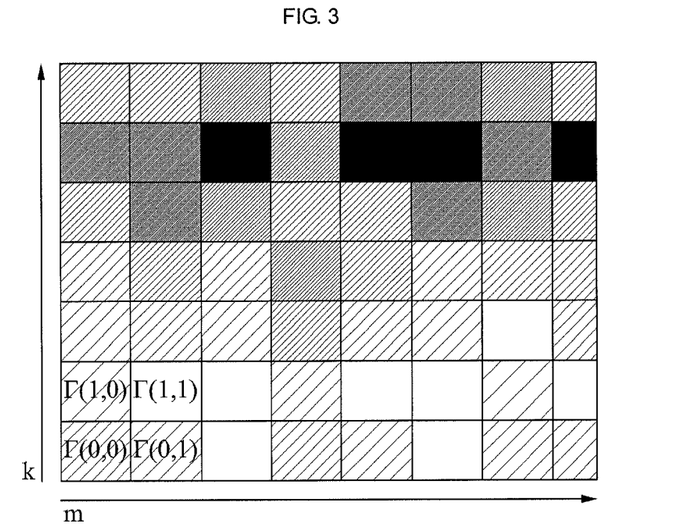
FIG. 3 illustrates distribution of a panning coefficient in a time-frequency (T-F) grid according to embodiments.

FIG. 3 illustrates distribution of a panning coefficient in a T-F grid according to embodiments.

The T-F domain transform described with reference to FIG. 2 is performed in units of frames which include predetermined samples. Here, when m denotes a frame index and k denotes a frequency index, the T-F grid may be generated as shown in FIG. 3.

It is presumed that, when at least two sound sources are mixed in 2 channels, the at least two sound sources are not located on the same T-F grid. In this case, the panning coefficient may be calculated with reference to a frequency bin on the T-F grid having the indexes m and k.

In embodiments, it is presumed that the sound source is located at the right channel as the panning coefficient is approximated to 1 and at the left channel as the panning coefficient is approximated to 0. In addition, as the panning coefficient is approximated to 0.5, it is presumed that the sound source is almost spaced with respect to located at both the left channel and the right channel, that is, the sound source is located in a center with respect to the user.

In FIG. 3, on the T-F grid, the panning coefficient is displayed to be darker as the panning coefficient is greater and is displayed to be lighter as the panning coefficient is smaller. Also, in FIG. 3, as the frequency index k is greater, the sound source is located at the right on the average and, as the frequency index k is smaller, the sound source is located at the left on the average.

Figure 4:
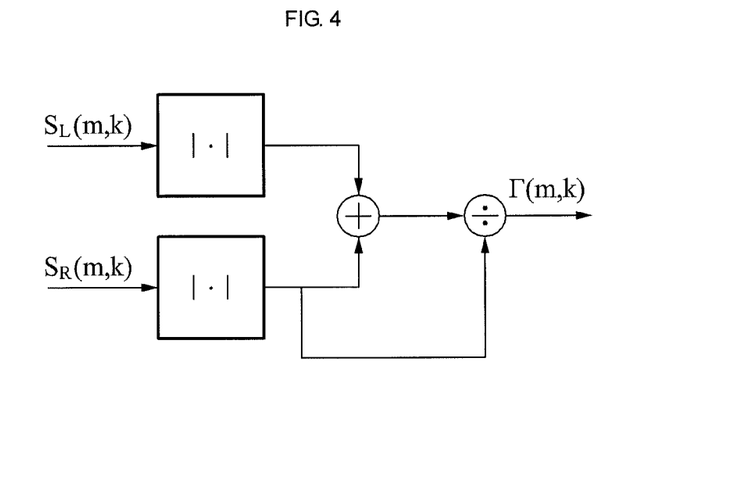
FIG. 4 illustrates a process of calculating a panning coefficient according to embodiments.

FIG. 4 illustrates a process of calculating a panning coefficient according to embodiments.

The panning coefficient representing the directivity of the sound source may be derived through Equation 1 and Equation 2 introduced below. The panning coefficient calculated by Equation 1 may be derived through configuration of a panning coefficient calculation unit shown in FIG. 4.

$$\Gamma(m, k) = \frac{|S_R(m, k)|}{|S_L(m, k)| + |S_R(m, k)|} \quad \text{[Equation 1]}$$

$$\Gamma(m, k) = \frac{2}{\pi}\arctan\left(\frac{|S_R(m, k)|}{|S_L(m, k)|}\right) \quad \text{[Equation 2]}$$

Complexity of the panning coefficient is lower when Equation 1 is used than when Equation 2 is used. However, the panning coefficient calculated by Equation 1 has lower accuracy than when the panning coefficient is calculated by Equation 2 and, therefore, may not correctly reflect the direction of the sound source.

Figure 5:
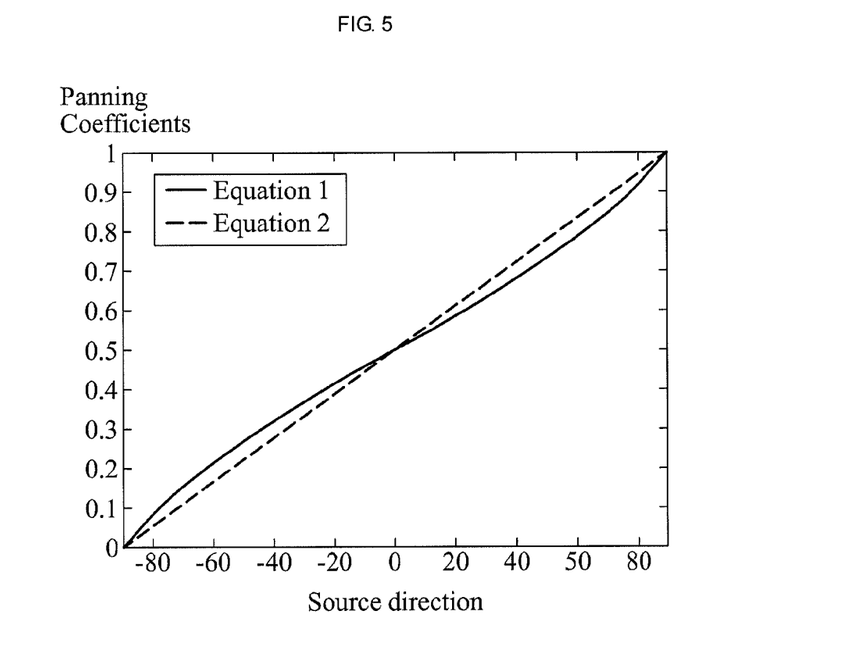
FIG. 5 illustrates a difference in derived panning coefficients according to a panning coefficient calculating method according to embodiments.

FIG. 5 illustrates a difference in derived panning coefficients according to a panning coefficient calculating method according to embodiments.

FIG. 5 shows a difference between the panning coefficient calculated by Equation 1 and the panning coefficient calculated by Equation 2. In a graph shown in FIG. 5, presuming that −90° denotes the left side and +90° denotes the right side, it is understood that the panning coefficient calculated by Equation 2 reflects the direction of the sound source more accurately than the panning coefficient calculated by Equation 1. That is, the panning coefficient calculated by Equation 1 may cause an error according to the direction of the sound source and therefore have a lower accuracy than the panning coefficient calculated by Equation 2.

Accordingly, Equation 1 may be applied to a system requiring quick processing while Equation 2 may be applied to a system requiring high quality performance.

Figure 6:
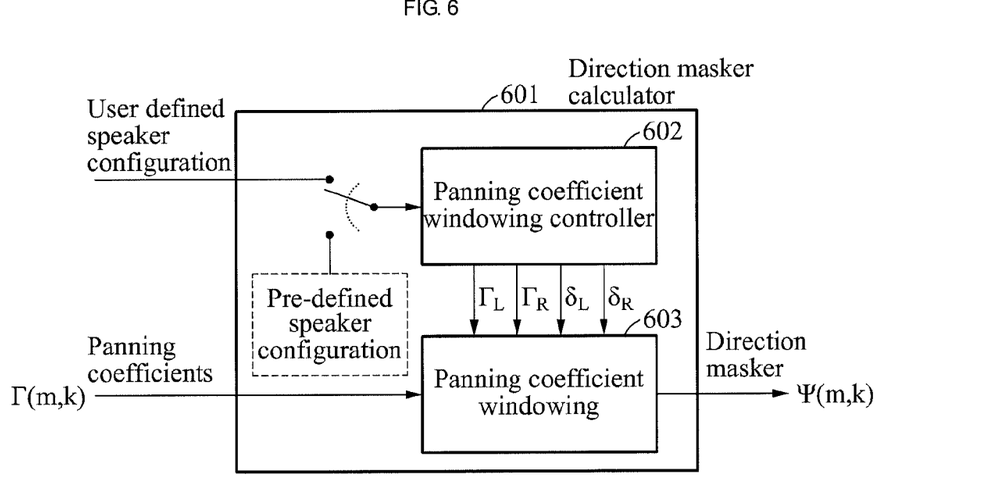
FIG. 6 illustrates a process of determining a direction masker according to embodiments.

FIG. 6 illustrates a process of determining a direction masker according to embodiments.

The direction masker is used for extracting a sound source of a desired direction. For example, to extract a sound source corresponding to the center at which the panning coefficient is 0.5, the direction masker of a T-F grid having a value of 0.5 as the panning coefficient needs to be a value of 1. However, since the sound source is not perfectly independent in each T-F grid, the direction masker values in which the panning coefficient is approximately equal to 0.5 may also be included.

Furthermore, a sound source located between adjacent speakers does not perfectly correspond to a direction of a real speaker. For the sound source located between the adjacent speakers, the adjacent speakers may output sound simultaneously with a proper sound pressure so that an effect as if the sound source was reproduced in a location between two adjacent speakers is achieved.

To achieve the aforementioned effect, a section in which adjacent panning coefficient windows overlap is necessary. Therefore, the panoramic sound generation apparatus may be configured so that a sum of the two panning coefficient windows becomes 1 in the overlap section. Therefore, loss of any sound source during extraction of the sound source may be prevented.

FIG. 6 illustrates the process of determining the direction masker satisfying the foregoing characteristics. When the output signal is output to the stereo speaker or the pair of headphones, that is, the sound output device requiring virtual localization, a masker determination unit 601 may determine a control coefficient for windowing the panning coefficient using configuration information of a predetermined sound output device. The masker determination unit 601 may also be referred to as a direction masker calculator. The master determination unit 601 includes a panning coefficient windowing controller 602 and panning coefficient windowing 603.

When the output signal is output to a real multichannel speaker, that is, the sound output device not requiring virtual localization, the masker determination unit 601 may determine a control coefficient for windowing the panning coefficient by receiving configuration information of the multichannel speaker which is the sound output device used by the user. The process of determining the direction masker ψ(m, k) shown in FIG. 6 will be described in detail with reference to FIG. 7.

Figure 7:
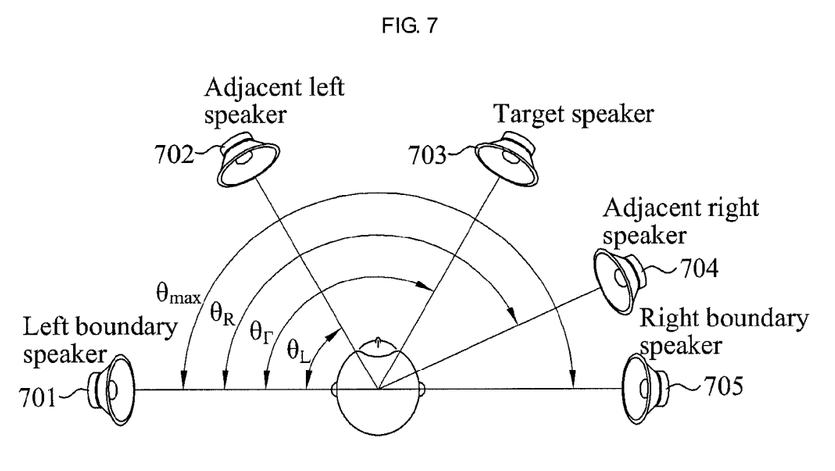
FIG. 7 illustrates a sound output device, determined by a user, according to embodiments.

FIG. 7 illustrates a sound output device, for example a speaker, determined by a user, according to embodiments.

Configuration of the sound output device, input to the direction masker determination unit 601, is shown in FIG. 7. The configuration information may be input by the user or may be configuration information of a predetermined multichannel speaker, for example, a 5.1-channel speaker.

An angle formed between a speaker 701 corresponding to a left boundary with respect to the user and a speaker 705 corresponding to a right boundary is denoted by $\theta_{max}$. An angle defined by a speaker 703 corresponding to a target location is denoted by $\theta_T$. An angle defined by an adjacent left speaker 702 with respect to the target location is denoted by $\theta_L$. An angle based on an adjacent right speaker 704 with respect to the target location is denoted by $\theta_R$.

Control coefficients $\Gamma_L$, $\Gamma_R$, $\delta_L$, and $\delta_R$ for windowing the panning coefficient may be determined by Equation 3 or Equation 4. Here, Equation 3 is used when the panning coefficient is calculated by Equation 1. Equation 4 is used when the panning coefficient is calculated by Equation 2.

$$\theta'_T = \frac{\pi}{2}\frac{\theta_T}{\theta_{max}}, \theta'_L = \frac{\pi}{2}\frac{\theta_L}{\theta_{max}}, \theta'_R = \frac{\pi}{2}\frac{\theta_R}{\theta_{max}} \quad \text{[Equation 3]}$$

$$\rho_T = \frac{\sin\theta'_T}{\cos\theta'_T + \sin\theta'_T}$$

$$\rho_L = \frac{\sin\theta'_L}{\cos\theta'_L + \sin\theta'_L}$$

$$\rho_R = \frac{\sin\theta'_R}{\cos\theta'_R + \sin\theta'_R}$$

$$\delta_L = \rho_T - \rho_L$$
$$\delta_R = \rho_R - \rho_T$$
$$\Gamma_L = \rho_T - \delta_L$$
$$\Gamma_R = \rho_T - \delta_R$$

$$\theta'_T = \frac{\pi}{2}\frac{\theta_T}{\theta_{max}}, \theta'_L = \frac{\pi}{2}\frac{\theta_L}{\theta_{max}}, \theta'_R = \frac{\pi}{2}\frac{\theta_R}{\theta_{max}} \quad \text{[Equation 4]}$$

$$\rho_T = \frac{2}{\pi}\arctan\left(\frac{\sin\theta'_T}{\cos\theta'_T}\right)$$

$$\rho_L = \frac{2}{\pi}\arctan\left(\frac{\sin\theta'_L}{\cos\theta'_L}\right)$$

$$\rho_R = \frac{2}{\pi}\arctan\left(\frac{\sin\theta'_R}{\cos\theta'_R}\right)$$

$$\delta_L = \rho_T - \rho_L$$
$$\delta_R = \rho_R - \rho_T$$
$$\Gamma_L = \rho_T - \delta_L$$
$$\Gamma_R = \rho_T - \delta_R$$

The direction masker ψ(m, k) for masking a sound source having a panning coefficient corresponding to a direction of the speaker 703 that corresponds to the target location may be determined by Equation 5, using the control coefficients calculated by Equation 3 or Equation 4.

$$\Psi(\Gamma) = \begin{cases} 0.5\left(1 - \cos\left(\frac{\pi(\Gamma - \Gamma_L)}{\delta_L}\right)\right) & \Gamma_L < \Gamma \leq \Gamma_L + \delta_L \\ 0.5\left(1 - \cos\left(\frac{\pi(\Gamma - \Gamma_R)}{\delta_R}\right)\right) & \Gamma_L + \delta_L < \Gamma \leq \Gamma_R + 2\delta_R \\ 0 & \text{otherwise} \end{cases} \quad \text{[Equation 5]}$$

Figure 8:
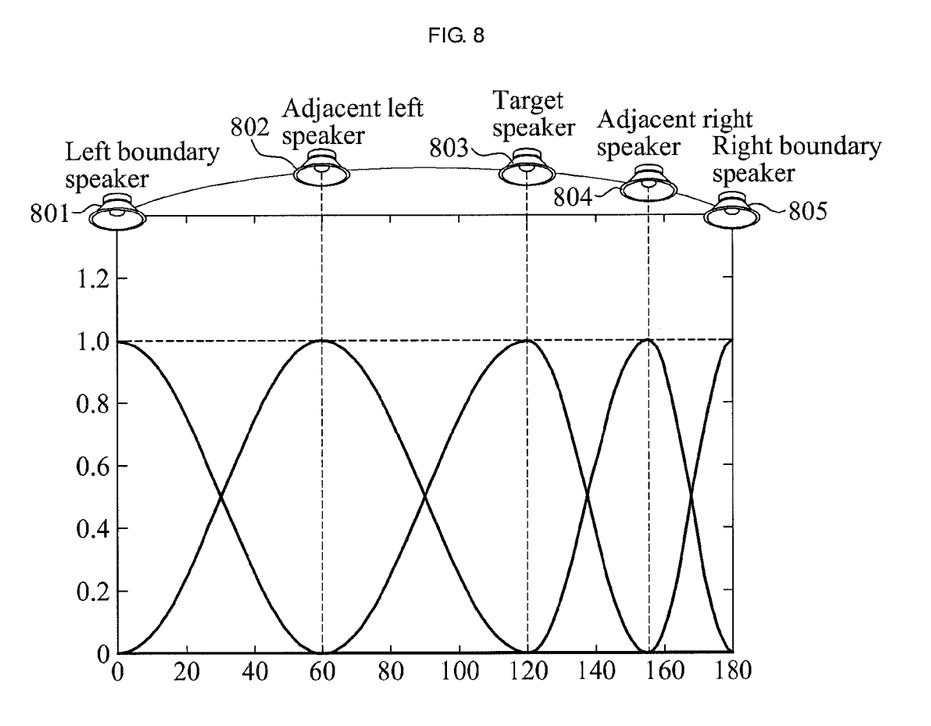
FIG. 8 illustrates a process of processing a panning coefficient window according to embodiments.

FIG. 8 illustrates a process of processing a panning coefficient window according to embodiments, and shows left boundary speaker 801, adjacent left speaker 802, target speaker 803, adjacent right speaker 804, and right boundary speaker 805.

When the angle $\theta_{max}$ is 180°, the angle $\theta_L$ is 60°, the angle $\theta_T$ is 120°, and the angle $\theta_R$ is 155° in FIG. 7, the panning coefficient window may be derived as shown in FIG. 8. Referring to FIG. 8, the panning coefficient window becomes 1 in a direction corresponding to the speaker 803 as the sound output device, and is reduced to 0 in a direction toward the adjacent speakers 802 and 804.

The panning coefficient windows may be overlapped between the adjacent speakers and, as a result, the sum of the panning coefficient windows becomes 1, thereby preventing loss of the sound source between adjacent speakers.

Figure 9:
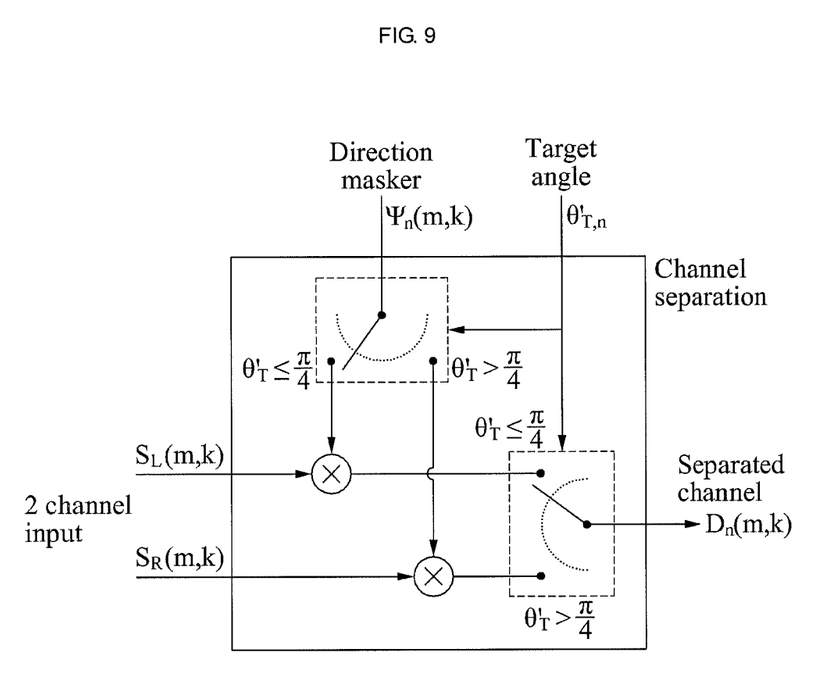
FIG. 9 illustrates a detailed structure of a channel separation unit according to embodiments.

FIG. 9 is a diagram illustrating a detailed structure of a channel separation unit 901 according to embodiments.

When the angle $\theta'_T$ of the speaker corresponding to the target location is greater than π/4, the channel separation unit 901 may output an output signal D(m, k) separated by multiplying a direction masker by a right input signal $S_R$(m, k). Conversely, when the angle $\theta'_T$ of the speaker corresponding to the target location is smaller than π/4, the channel separation unit 901 may output an output signal D(m, k) separated by multiplying a direction masker by a left input signal $S_L$(m, k).

Figure 10:
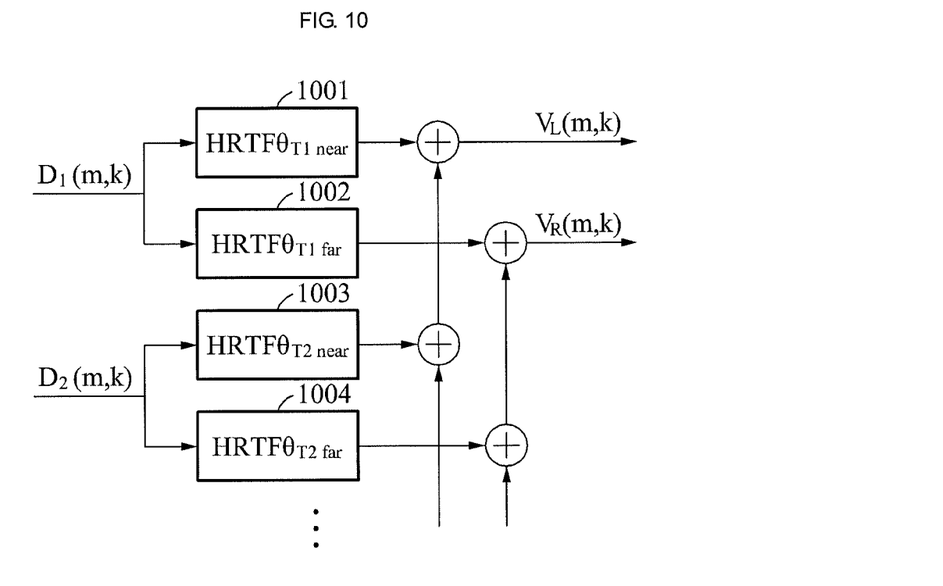
FIG. 10 illustrates a detailed structure of a virtual localization unit when a sound output device is a headphone.

FIG. 10 illustrates a detailed structure of a virtual localization unit when a sound output device is a pair of headphones.

When the sound output device is the pair of headphones, the virtual localization unit may apply HRTFs 1001 to 1004 in locations T1, T2, . . . etc. of respective predetermined speakers, thereby outputting a left output signal $V_L$(m, k) and a right output signal $V_R$(m, k) capable of recognizing a virtual multichannel signal through the pair of headphones.

Figure 11:
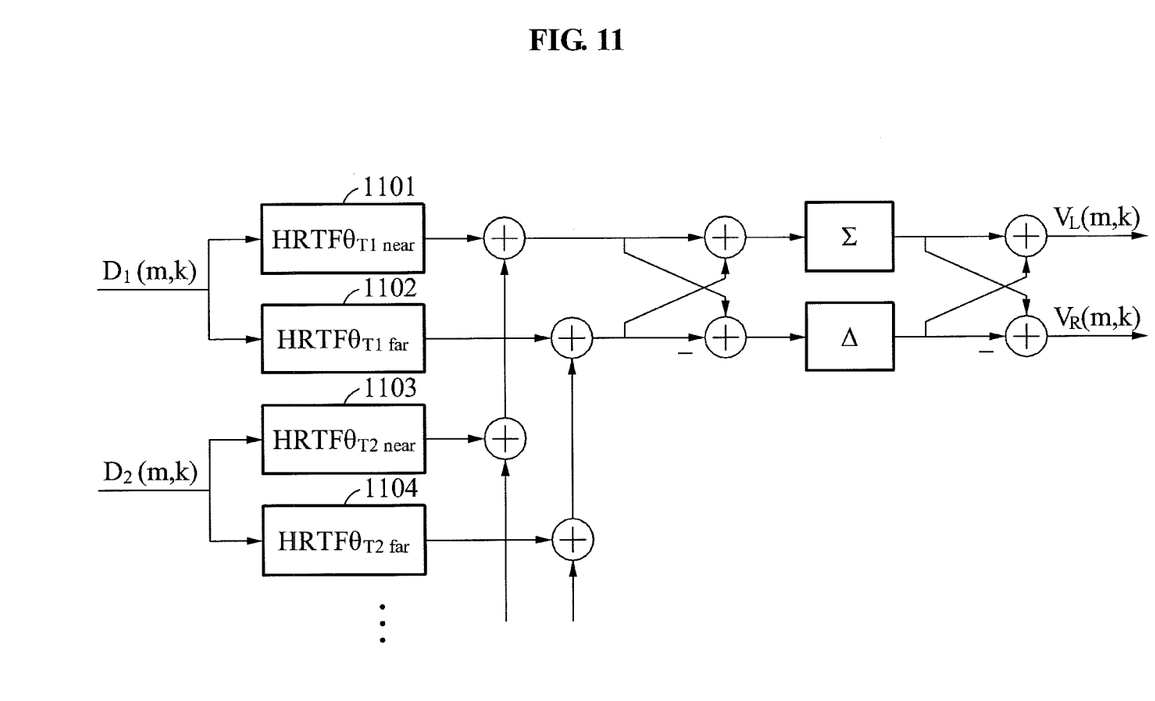
FIG. 11 illustrates a detailed structure of a virtual localization unit when a sound output device is a stereo speaker.

FIG. 11 illustrates a detailed structure of a virtual localization unit when a sound output device is a stereo speaker.

When the sound output device is the stereo speaker different from the speaker in FIG. 10, the virtual localization unit may additionally apply a crosstalk canceller in comparison to the case of FIG. 10.

$\Sigma$ and $\Delta$ of the crosstalk canceller may be derived by Equation 6. In Equation 6, $H_i$ denotes a transfer function from the speaker to an ear of a listener located in the same direction as the speaker. The transfer function in such a case may be defined as a same-direction transfer function. Further, $H_c$ denotes a transfer function from the speaker to an ear of a listener located in the opposite direction to the speaker. The transfer function of such a case may be defined as an opposite-direction transfer function.

$$\Sigma = \frac{1}{2(H_i + H_c)}$$
$$\Delta = \frac{1}{2(H_i - H_c)}$$
[Equation 6]

Figure 12:
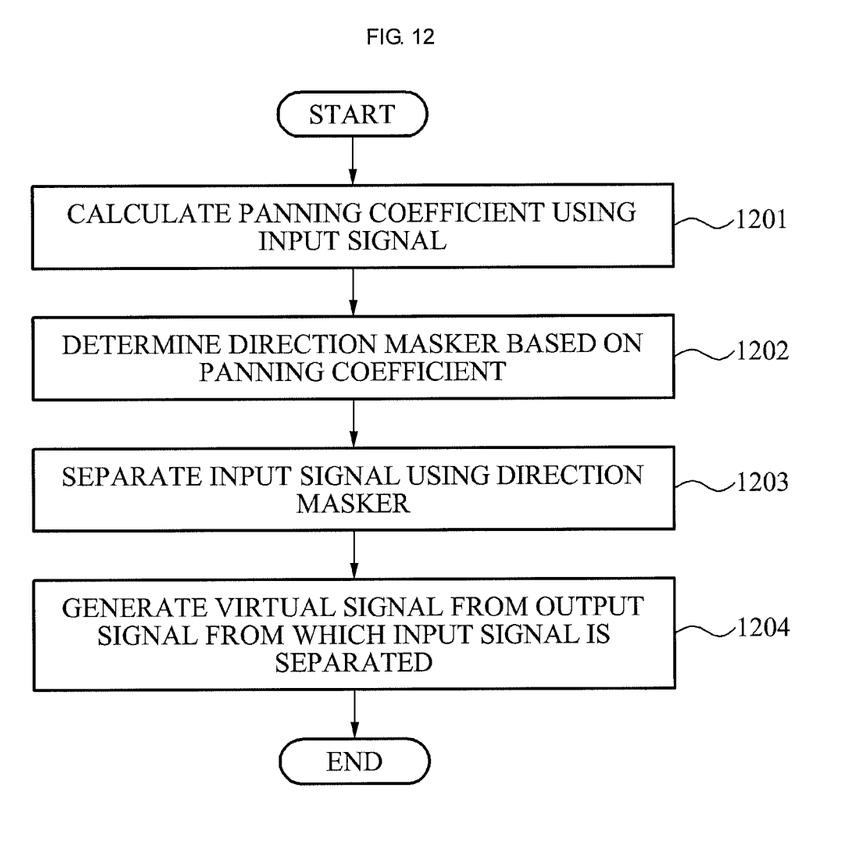
FIG. 12 illustrates a panoramic sound generation method according to embodiments.

FIG. 12 illustrates a flowchart of a panoramic sound generation method according to embodiments.

In operation 1201, a panoramic sound generation apparatus may calculate a panning coefficient representing directivity of a sound source using an input signal. For example, the panoramic sound generation apparatus may calculate the panning coefficient using a frequency component based on the input signal.

In operation 1202, the panoramic sound generation apparatus may determine a direction masker for extracting a sound source of a desired direction based on the panning coefficient. Here, the panoramic sound generation apparatus may determine the direction masker for masking a sound source having a panning coefficient corresponding to a direction of a sound output device that corresponds to a target location.

For example, the panoramic sound generation apparatus may perform a process of determining a control coefficient and a process of windowing.

In further detail, the panoramic sound generation apparatus may determine the control coefficient for windowing the panning coefficient using configuration information of the sound output device. For example, the panoramic sound generation apparatus may determine the control coefficient using a first angle based on a first sound output device corresponding to a left boundary and a second sound output device corresponding to a right boundary, a second angle based on a third sound output device corresponding to a target location, a third angle based on a fourth sound output device adjoining a left side of the target location, and a fourth angle based on a fifth sound output device adjoining a right side of the target location.

In addition, the panoramic sound generation apparatus may process the panning coefficient window based on the sound output device, using the control coefficient. The panoramic sound generation apparatus may process a window of which a value is maximized in a direction corresponding to the sound output device and decreased in a direction toward an adjacent sound output device.

In operation 1203, the panoramic sound generation apparatus may separate the input signal as an output signal to be output to the sound output device, using the direction masker. For example, the panoramic sound generation apparatus may apply the direction masker to the input signal based on an angle of a sound output device corresponding to the target location.

In operation 1204, the panoramic sound generation apparatus may generate a virtual signal from the output signal according to a type of the sound output device. For example, the panoramic sound generation apparatus may generate the virtual signal by applying an HRTF when the sound output device is a pair of headphones. When the sound output device is a stereo speaker, the panoramic sound generation apparatus may generate the virtual signal by applying the HRTF and a crosstalk canceller.

The methods according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts.

Processes, functions, methods, and/or software in apparatuses described herein may be recorded, stored, or fixed in one or more non-transitory computer-readable storage media (non-transitory computer readable recording media) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, non-transitory computer-readable storage media may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although embodiments have been shown and described, it would be appreciated by those skilled in the art that changes may be made in these embodiments without departing from the principles and spirit of the disclosure, the scope of which is defined in the claims and their equivalents.

What is claimed is:

1. A panoramic sound generation apparatus comprising:
a panning coefficient calculator, using at least one processor, to calculate a panning coefficient that represents directivity of a sound source using an input signal;

a masker determiner, using at least one processor, to determine a direction masker that extracts a sound source of a desired direction based on the panning coefficient;
a channel separator, using at least one processor, to separate the input signal to be used as an output signal, and to output the output signal to a sound output device, using the direction masker; and
a virtual localizer, using at least one processor, to generate a virtual signal from the output signal according to a type of the sound output device,
wherein the masker determiner comprises a control coefficient determiner to determine a control coefficient for windowing the panning coefficient using configuration information of the sound output device, and a window processor to process a panning coefficient window based on the sound output device using a control coefficient,
wherein adjacent two panning coefficient windows are overlapped and a sum of the two panning coefficient windows becomes a specific value, and
wherein the channel separator applies the direction masker to the input signal based on an angle of the sound output device that corresponds to a target location.

2. The panoramic sound generation apparatus of claim 1, wherein the panning coefficient calculator calculates the panning coefficient using a frequency component based on the input signal.

3. The panoramic sound generation apparatus of claim 1, wherein the control coefficient determiner determines the control coefficient using a first angle based on a first sound output device corresponding to a left boundary and a second sound output device corresponding to a right boundary, a second angle based on a third sound output device corresponding to a target location, a third angle based on a fourth sound output device adjoining a left side of the target location, and a fourth angle based on a fifth sound output device adjoining a right side of the target location.

4. The panoramic sound generation apparatus of claim 1, wherein the window processor processes a window of which a value is maximized in a direction corresponding to the sound output device and decreased in a direction toward an adjacent sound output device.

5. The panoramic sound generation apparatus of claim 1, wherein the masker determiner determines the direction masker for masking a sound source having a panning coefficient corresponding to a direction of the sound output device that corresponds to a target location.

6. The panoramic sound generation apparatus of claim 1, wherein the virtual localizer applies a head related transfer function (HRTF) to generate the virtual signal when the sound output device is a pair of headphones, and applies the HRTF and a crosstalk canceller to generate the virtual signal when the sound output device is a stereo speaker.

7. A panoramic sound generation method comprising:
calculating, using at least one processor, a panning coefficient that represents directivity of a sound source using an input signal;
determining a direction masker that extracts a sound source of a desired direction based on the panning coefficient;
separating the input signal to be used as an output signal, and outputting the output signal to a sound output device, using the direction masker; and
generating a virtual signal from the output signal according to a type of the sound output device,
wherein the determining determines a control coefficient for windowing the panning coefficient using configuration information of the sound output device and processes a panning coefficient window based on the sound output device using a control coefficient,
wherein adjacent two panning coefficient windows are overlapped and a sum of the two panning coefficient windows become a specific value, and
wherein the separating applies the direction masker to the input signal based on an angle of the sound output device that corresponds to a target location.

8. The panoramic sound generation method of claim 7, wherein the calculating calculates the panning coefficient using a frequency component based on the input signal.

9. The panoramic sound generation method of claim 7, wherein the determining of the control coefficient determines the control coefficient using a first angle based on a first sound output device corresponding to a left boundary and a second sound output device corresponding to a right boundary, a second angle based on a third sound output device corresponding to a target location, a third angle based on a fourth sound output device adjoining a left side of the target location, and a fourth angle based on a fifth sound output device adjoining a right side of the target location.

10. The panoramic sound generation method of claim 7, wherein the processing processes the panning coefficient window of which a value is maximized in a direction corresponding to the sound output device and decreased in a direction toward an adjacent sound output device.

11. The panoramic sound generation method of claim 7, wherein the determining of the direction masker determines the direction masker for masking a sound source having a panning coefficient corresponding to a direction of the sound output device that corresponds to a target location.

12. The panoramic sound generation method of claim 7, wherein the generating comprises:
generating the virtual signal by applying a head related transfer function (HRTF) when the sound output device is a headphone; or
generating the virtual signal by applying the HRTF and a crosstalk canceller when the sound output device is a stereo speaker.

13. A non-transitory computer readable recording medium storing computer readable instructions to cause at least one processor to implement the method of claim 7.

14. A panoramic sound generation apparatus comprising:
a masker determiner, using at least one processor, to determine a direction masker that extracts a sound source of a desired direction based on a panning coefficient which represents directivity of a sound source based on an input signal; and
a channel separator, using at least one processor, to separate the input signal to be used as an output signal, and to output the output signal to a sound output device, using the direction masker,
wherein the masker determiner determines a control coefficient for windowing the panning coefficient according to a type of the sound output device,
wherein the masker determiner comprises a control coefficient determiner to determine a control coefficient for windowing the panning coefficient using configuration information of the sound output device, and a window processor to process a panning coefficient window based on the sound output device using a control coefficient, wherein adjacent two panning coefficient windows are overlapped and a sum of the two panning coefficient window becomes a specific value, and wherein the channel separator applies the direction masker to the input signal based on an angle of the sound output device that corresponds to a target location.

15. A panoramic sound generation method comprising:

determining a direction masker that extracts a sound source of a desired direction based on the panning coefficient which represents directivity of a sound source based on an input signal; and separating the input signal to be used as an output signal using at least one processor, and outputting the output signal to a sound output device, using the direction masker, wherein the determining determines a control coefficient for windowing the panning coefficient according to a type of the sound output device, and processes a panning coefficient window based on the sound output device using a control coefficient, wherein adjacent two panning coefficient windows are overlapped and a sum of the two panning coefficient windows become a specific value, and wherein the separating applies the direction masker to the input signal based on an angle of the sound output device that corresponds to a target location.

16. A non-transitory computer readable recording medium storing computer readable instructions to cause at least one processor to implement the method of claim 15.

* * * * *